May 9, 1961 G. H. MUSE, JR 2,983,189
PHOTOGRAPHIC COPY APPARATUS
Filed April 24, 1958 2 Sheets-Sheet 1

INVENTOR.
GRANT H. MUSE, JR.
BY
ATTORNEY

May 9, 1961 G. H. MUSE, JR 2,983,189
PHOTOGRAPHIC COPY APPARATUS
Filed April 24, 1958
2 Sheets-Sheet 2

INVENTOR.
GRANT H. MUSE, JR.
BY
ATTORNEY

United States Patent Office 2,983,189
Patented May 9, 1961

2,983,189
PHOTOGRAPHIC COPY APPARATUS

Grant H. Muse, Jr., Mirfield, England, assignor to Minneapolis-Honeywell Regulator Company, Minneapolis, Minn., a corporation of Delaware Filed Apr. 24, 1958, Ser. No. 730,686
2 Claims. (Cl. 88—24)

The present invention is concerned with an improved photographic apparatus and more particularly with a photographic apparatus which is utilized to copy photographic transparencies.

The so called miniature or 35 mm. camera has now become quite popular and in most cases these cameras are utilized with a film which produces a color diapositive, or transparency. This particular type of film produces a positive transparency and the user of the camera derives only a single transparency, or slide, from each picture that is taken with the camera. If further pictures are desired, or if a portion of the original transparency is to be cropped and enlarged to the full format of the 35 mm. camera, it is necessary to resort to a trial and error copying method or to very complex and expensive duplicating equipment.

Prior art photographic apparatus which is utilized to copy such a transparency or slide in many cases utilizes the trial and error method since these apparatus do not provide in a single unitized apparatus a controlled light source which is fixed in relation to the copying camera and which correlates the intensity of the light source to the film to be used and to characteristics of the copying camera. For this reason, it is necessary to first try one setting of the camera and positioning of the light source and then to vary this until the desired results are obtained. This is extremely tedious, and especially so in the case of the 35 mm. camera where a number of exposures must be taken before the film can be developed. If the photographer has inadvertently chosen the wrong conditions, the process must be repeated in second trial in an attempt to obtain satisfactory reproductions of the transparency which is to be copied.

The object of the present invention is to provide an improved photographic apparatus for use in copying a photographic transparency, which apparatus utilizes a controlled and self contained light source, to thereby insure that the transparency will always be subjected to the same intensity of illumination. Furthermore, the copying camera is mounted in a fixed relationship to this light source and the proper operation of the apparatus is facilitated by a scale member which is constructed taking into account the intensity of the illumination source, the positioning of the photographic transparency to be copied, the characteristics of the camera, and the characteristics of the film to be used in the camera, to thereby facilitate extremely simple and accurate copying such as has been unavailable except in very complicated prior art devices. The present invention fulfills a long felt need for an accurate and yet inexpensive copying device which because of its simplicity could be readily available to not only small groups such as camera clubs, but to the individual amateur who may find it desirable to perform copy work.

Furthermore, the apparatus of the present invention provides an electronic flash apparatus for the above mentioned light source. Since the flash of the electronic flash apparatus is of extremely short duration, the shutter speed of the copying camera is not a factor to be taken into consideration. The camera shutter speed will always be longer than the duration of the flash and therefore a single camera shutter may be utilized, again simplifying the apparatus.

A further advantage of the use of an electronic flash apparatus is the fact that vibration or movement of the improved photographic apparatus during use will have no effect upon the copying of the transparency since the extremely short duration of the flash tends to freeze movement which may be present and thereby give a clear copy of the transparency which is being copied.

These and other objects of the present invention will be apparent to those skilled in the art upon reference to the following specification, claims and drawings, of which:

Figure 1:
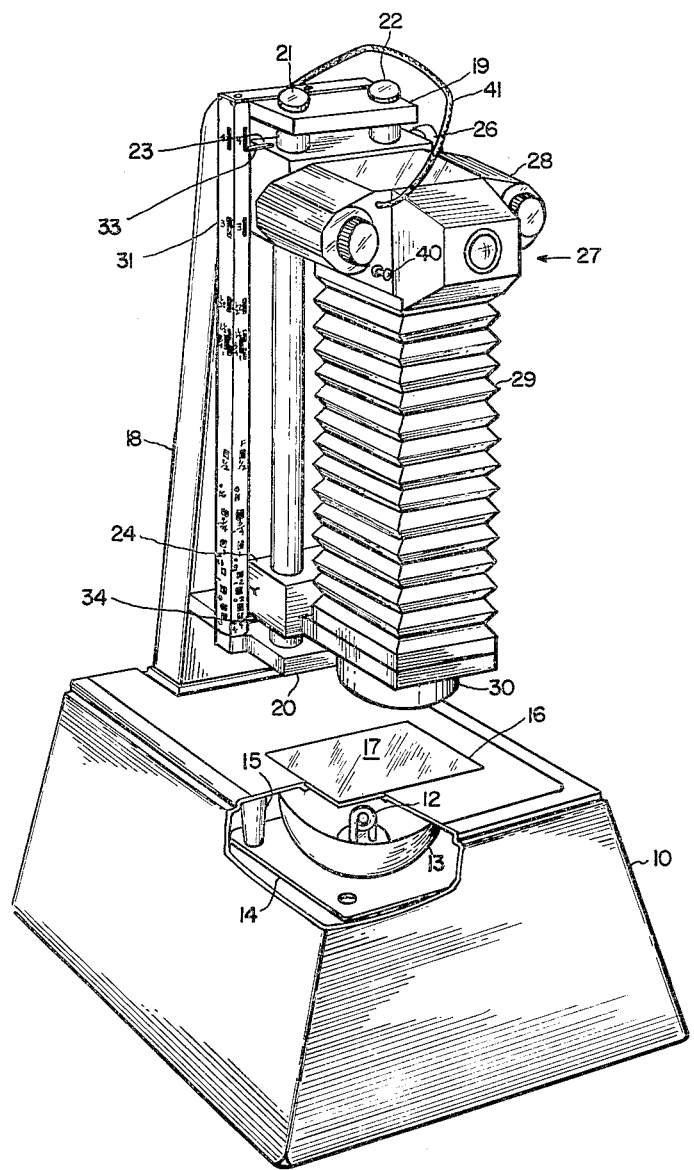
Figure 1 is a perspective view of the improved photographic apparatus, showing a portion of the housing thereof cut away to expose the electronic flash tube and reflector of the electronic flash apparatus.

Referring specifically to Figure 1, the reference numeral 10 designates a housing which is a box like shape and forms the base of the apparatus. This housing 10 is a hollow housing and houses the electrical components of an electronic flash apparatus including an electronic flash tube 12 and its reflector 13 which are mounted on a mounting board 14. Mounting board 14 is attached to housing 10 by means of mounting posts, one of which is shown at 15; or by any other such convenient means which will insure the proper orientation of member 17 relative to housing 10. The flash tube 12 and its reflector 13 are positioned immediately below an opening 16, which is provided in the upper generally horizontally disposed top of the housing 10. This opening 16 is closed by one or more sheets of transparent or translucent material, generally frosted glass, which allows the light emitted by the flash tube 12 to leave the housing 10.

Since this controlled light source, in the form of flash tube 12, is fixed in a definite relation to the opening 16 in housing 10, the quantity of light emitted out of this opening and through member 17 is always uniform. Therefore, a photographic transparency which is positioned over member 17 is always subjected to the same intensity of illumination, thereby giving a controlled condition to facilitate accurate copying of this transparency.

For purposes of simplicity, a transparency to be copied is not shown in Figure 1. However, the transparency may either be loosely placed on member 17 or the transparency may be placed on a metal sheet, not shown, which sheet is provided with an opening. The transparency may then be held to this metal sheet by magnets, with the metal sheet and transparency then being placed on the member 17. The use of such a metal plate provides additional weight to insure that the transparency once it is positioned accurately is not readily moved by accidental jarring of the apparatus.

The reference numeral 18 designates a support member which is fixed at the lower end thereof to the housing 10. This support member 18 is provided with a pair of horizontally extending members 19 and 20 which carry a pair of traversing rods 21 and 22.

The traversing rods 21 and 22 are provided with gear teeth which are machined into the back thereof. These gear teeth are not visible in the showing of Figure 1. The rods 21 and 22 also mount first and second moveable members 23 and 24 which are respectively associated with the film carrying portion 28 and the lens assembly 30 of a camera 27. These two movable members 23 and 24 are adapted to be moved relative to each other by the means of positioning knobs, one of which is shown at 26 and a corresponding one of which is associated with member 24 but is not shown in Figure 1. By movement of knob 26, a gear which is carried by movable member 23 engages the gear teeth in the back of rods 21 and 22 and thereby causes member 23 to ride up and down these two rods. Likewise, a further positioning knob, not shown in Figure 1, is associated with member 24 and rotation of this knob causes this member 24 to ride up and down the rods 21 and 22, again due to a gear which is contained in member 24 and engages the teeth in back of rods 21 and 22.

The reference numeral 27 identifies the camera assembly, in this case a 35 mm. single lens reflex camera, having a film carrying portion 28 which is mounted on member 23 and having a flexible bellows assembly 29 connecting this portion 28 to the lens assembly 30, which lens assembly is carried by movable member 24. Therefore, movement of members 23 and 24 determines the focusing of the camera and the magnification to be provided.

In many cases, the photographer finds it desirable to select only a portion of an original transparency and to magnify, enlarge, or blow up this portion of the original to the full format of the camera. In order to enlarge in this manner or to directly copy the entire transparency, and to do this accurately, it is necessary not only to have the controlled light source, such as has been described, but it is also necessary to provide a fixed relationship between the copying camera, the transparency to be copied, and the light source which is to furnish the light for copying. The apparatus of this invention provides such a construction by mounting the camera in a fixed relationship to the plane of the member 17 and to the light source 12. Therefore, a scale can be provided such that a given movement of the members of the camera with respect to the plane of the member 17 results in controlled and consistent magnification independent of the other conditions such as the type of film and camera shutter opening.

A further scale setting must however be provided for the camera. It will be remembered that the camera shutter speed is no longer important since an electronic flash is utilized as the source of light. However, the iris diaphragm opening or aperture which controls the amount of light reaching the film must be indicated. This diaphragm opening or aperture is dependent upon the intensity of the light source, which in the case of the present invention is a controlled and uniform light source, upon the effective photographic speed of the film being used in the copying camera, and upon the magnification which is being achieved. It is readily apparent that if direct copying of the original transparency is to be achieved, the entire quantity or volume of light transmitted through the transparency, is viewed by the lens. However, if only a portion of this transparency is being copied, only a portion of the light transmitted through the transparency is viewed by the lens. Therefore, it is necessary to take into account the amount of magnification when determining diaphragm opening for the camera.

These above considerations are expressed in the form of a scale member identified by the reference numeral 31. This scale member is shown as a square rod rotatably mounted on the support member 18 by mounting means provided in the members 19 and 20. This square rod is rotatable and each of the four sides of this rod is calibrated for a different type of film. Moveable member 23 is positioned such that its pointer 33 lies adjacently the upper area of the scale indicating a magnification of 4, while the lower moveable member 24 has its pointer 34 adjacent the lower scale indicia indicating a magnification of 4. As a result, pointer 34 associated with moveable member 24 indicates that the diaphragm opening for lens 30 is to be set at approximately $f4$. With the apparatus as adjusted in Figure 1, ¼ of a 35 mm. original transparency positioned over member 17 will be copied as it appears on the original and this ¼ portion will be enlarged to the full format of the 35 mm. camera 27. In other words, this portion will be magnified four times.

Figures 2, 3, 4:
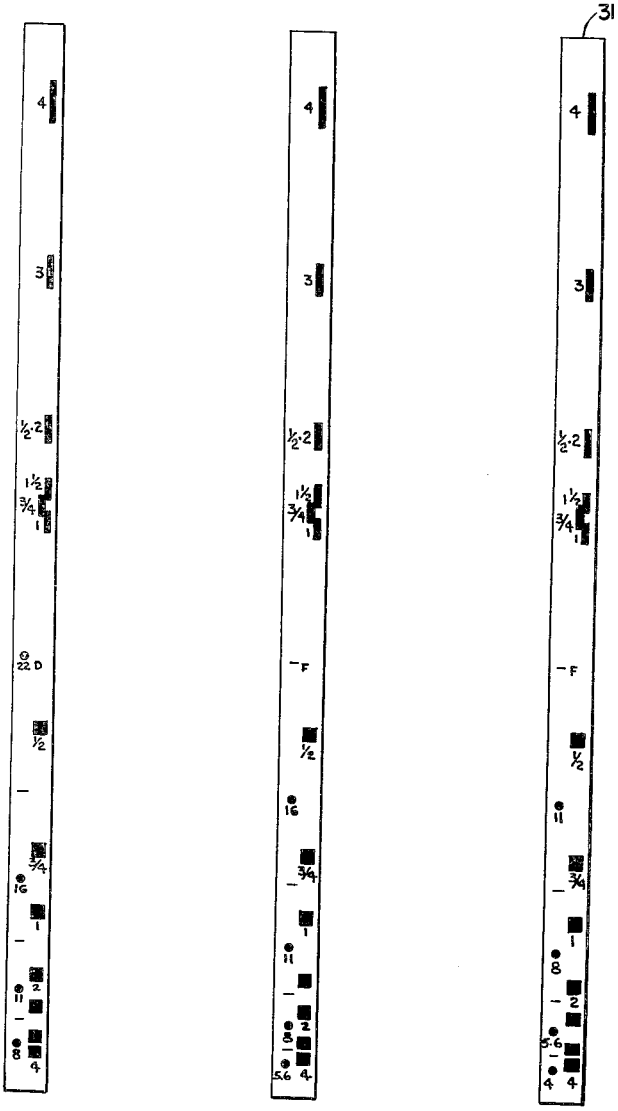
Figure 2 is an enlarged drawing of a first portion of the scale of Figure 1.
Figure 3 is an enlarged drawing of a second portion of the scale of Figure 1
Figure 4 is an enlarged view of a third portion of the scale of Figure 1.

Figure 4 shows an enlarged view of this side of the rod 31. From this view it can be seen that the right hand portion of the scale contains indicia indicating magnification, the upper portion thereof being associated with the moveable member 23 and the lower portion thereof being associated with the moveable member 24. The left hand portion of the rod contains indicia of $f$ stop or diaphragm openings for the camera, these indicia being contained in the lower portion of the scale and cooperating with the pointer 34 in member 24.

Likewise, Figures 2 and 3 show a similar scale for use when the film carrying portion of the camera 28 contains other type film.

Three typical films have been selected and the fourth face of the scale bar shows magnification only, allowing the user to mark in the $f$ stop numbers as determined for any other film. It is to be understood that the scale member 31 could be provided with a plurality of scales for any of the available films. Furthermore, this scale could be constructed as a flat member which could then provide a great number of scales.

The apparatus of Figure 1 is provided with the 35 mm. camera 27 and this camera is of the single lens reflex type. The camera is therefore focused by viewing the transparency positioned on member 17 through the lens 30. An actuating button 40 is provided to expose the film in member 28 to the light emitted through the transparency positioned on member 17. Furthermore, a shutter cord 41 is provided and this cord connects the internal shutter contacts of the camera to the electronic flash contained in the housing, thereby synchronizing the energization of flash tube 12 with the opening of the shutter of the camera.

From the above description it can be seen that I have provided an extremely simple and unitized photographic copying apparatus which utilizes a standard light source in the form of an electronic flash apparatus and which provides for mounting a transparency to be copied in a fixed relation to this light source and to a copying camera, thereby facilitating the accurate copying of the transparency as indicated by a scale member which is calibrated to take into account the film to be used in the copying camera as well as the intensity of the light source 12, the characteristics of the lens 30, and the magnification to be achieved. Other modifications of the present invention will be apparent to those skilled in the art and it is intended that the scope of the present invention be limited solely by the scope of the appended claims of which

I claim as my invention:

1. Photographic apparatus for use in copying a photographic transparency, comprising; an elongated support member, a housing mounted in a fixed position at one end of said support member, a light diffusing translucent window mounted in a wall of said housing facing said support member to view the other end thereof, a photographic flash unit disposed in a fixed position within said housing and arranged to emit light through said translucent window, the quantity of light passing through said translucent window being of a fixed value by virtue of the fixed relationship between said window and the light intensity of said flash unit, a camera including a film carrying housing and a bellows type lens assembly including an adjustable diaphragm opening, means movably mounting said film carrying housing and said lens assembly at said other end of said support member such that said lens assembly is aligned with and views said translucent window, and a single scale member mounted at a fixed position on said support member and containing three indicia of camera adjustment, a first of said indicia being indicative of magnification and cooperating with the position of said film carrying housing, a second of said indicia being indicative of magnification and cooperating with the position of said lens assembly, and a third of said indicia being indicative of lens diaphragm opening and cooperating with one of said first or second indicia, such that the film carrying housing and the lens assembly may be independently moved and the diaphragm opening may be adjusted in accordance with the indicia contained on said scale to copy a transparency, the magnification being determined by the relationship of the film carrying housing and lens assembly to said translucent window and the diaphragm opening being determined according to the film utilized in the camera, the magnification, and the fixed quantity of light.

2. Photographic copy apparatus for use in copying a photographic transparency or a portion thereof comprising; a housing member having an opening in a wall thereof, electronic flash apparatus including an electronic flash tube mounted at a fixed position adjacent said opening such that the light produced by said flash tube is emitted out of the opening in said housing, the light passing through said opening being of a fixed magnitude by virtue of the fixed relationship of said opening and the intensity of said flash tube, a rigid light diffusing translucent member covering said opening and adapted to receive a photographic transparency to be copied; a support member fixed to said housing and extending away from said housing in alignment with said opening; a camera having a film carrying portion which is connected to a lens by means of a bellows, said lens having an adjustable diaphragm opening; traverse rod means rigidly mounted to said support member and including means movably mounting the film carrying portion of said camera and said camera lens to thereby facilitate relative movement of said film carrying portion and said lens, with said lens being supported to view said opening and to gather the light which is transmitted through the transparency to be copied, the quantity of gathered light being determined by its diaphragm opening; a single scale member supported at a fixed position on said support member and providing a plurality of individual scales, each individual scale being calibrated in accordance with a specific type of film which may be used in the film carrying portion of said camera, and each individual scale having three indicia of camera adjustment, a first of said indicia being an indicia of magnification and cooperating with the position of said film carrying portion, a second of said indicia being an indicia of magnification and cooperating with the position of said lens, and a third of said indicia being an indicia of diaphragm opening and cooperating with one of said first or second indicia, the degree of magnification being determined by the relationship of the film carrying portion and the lens to said translucent member, and the diaphragm opening being determined according to the type of film utilized in the film carrying portion, the magnification desired, and the fixed magnitude of light; first pointer means mounted at a fixed position relative to said camera lens and movable therewith, and second pointer means mounted at a fixed position relative to the film carrying portion of said camera and movable therewith, said first and second pointer means overlying said scale member to facilitate proper adjustment of the camera.

References Cited in the file of this patent

UNITED STATES PATENTS

| 971,367 | Fruwirth | Sept. 27, 1910 |
| 1,227,075 | Rowntree | May 22, 1917 |
| 2,188,622 | Cantor | Jan. 30, 1940 |
| 2,530,396 | McGuffin | Nov. 21, 1950 |

FOREIGN PATENTS

| 250,919 | Switzerland | July 16, 1948 |
| 945,128 | Germany | June 28, 1956 |

OTHER REFERENCES

"Copying Kodachrome," Colman, article in "Photo Technique," October 1941, pages 30–33, and 48.